United States Patent
Siira

[19]

[11] Patent Number: 5,978,680
[45] Date of Patent: Nov. 2, 1999

[54] TRANSMISSION METHOD AND A CELLULAR RADIO SYSTEM

[75] Inventor: Mikko Siira, Tokyo, Japan

[73] Assignee: Nokia Telecommunications Oy, Espoo, Finland

[21] Appl. No.: 08/774,654

[22] Filed: Dec. 30, 1996

[51] Int. Cl.[6] .............................. H04Q 7/00; H04Q 9/00
[52] U.S. Cl. ......................... 455/442; 455/436; 370/331
[58] Field of Search ................................... 455/422, 436, 455/437, 438, 442, 524, 525, 67.1, 560, 439, 432, 550, 561; 370/335, 342, 503, 350, 331, 332, 320, 324

[56] References Cited

U.S. PATENT DOCUMENTS

| | | |
|---|---|---|
| 5,172,396 | 12/1992 | Rose, Jr. et al. . |
| 5,195,090 | 3/1993 | Bolliger et al. ......................... 455/436 |
| 5,268,933 | 12/1993 | Averbuch . |
| 5,293,380 | 3/1994 | Kondo . |
| 5,388,102 | 2/1995 | Griffith et al. . |
| 5,586,119 | 12/1996 | Scribano et al. ........................ 455/32.1 |
| 5,711,003 | 1/1998 | Dupuy ..................................... 455/436 |
| 5,787,078 | 7/1998 | Geywitz et al. ......................... 455/502 |

*Primary Examiner*—Reinhard J. Eisenzopf
*Assistant Examiner*—Edan Orgad
*Attorney, Agent, or Firm*—Pillsbury Madison & Sutro LLP

[57] ABSTRACT

The invention relates to a transmission method and a cellular radio system comprising base stations and at least one vocoder, the base stations and the vocoder transmitting a signal to each other, the base stations transmitting a signal to the vocoder substantially simultaneously, the vocoder receiving the substantially simultaneously transmitted signals at different moments of reception, in which cellular radio system after the vocoder has received the first signal, the vocoder is arranged to transmit signals to the base stations the signals of which arrive at the vocoder at least partly during a predetermined time window.

16 Claims, 2 Drawing Sheets

TRANSMISSION METHOD AND A CELLULAR RADIO SYSTEM

FIELD OF THE INVENTION

The invention relates generally to telecommunication systems. More precisely, the invention relates to a digital cellular radio system employing a soft hand-off.

BACKGROUND OF THE INVENTION

A typical cellular radio system comprises a fixed base station network, and a subscriber terminal communicates with one or more base stations of the network. A base station forwards the communication that arrives from a subscriber terminal. While moving or remaining stationary, subscriber terminals may transmit messages via the base stations both to each other and to subscriber terminals of other telephone systems. The transmission of messages is possible when the subscriber terminals are located in the coverage area of the base station network. In order for a subscriber terminal to be able to use the services provided by the cellular radio system, it should maintain a connection to at least one base station under all circumstances. When a subscriber terminal does not use the services provided by the base station network, it does not need a connection to the base station network but it listens to the base stations in an idle mode. When the subscriber terminal moves in the base station network from the coverage area of one base station to the coverage area of another base station, this creates a need to change the channel or the base station.

In a typical cellular radio system, a subscriber terminal communicates only with one base station at a time, even though especially for example in a CDMA system the subscriber terminal may also communicate simultaneously with several base stations. In a prior art soft hand-off, the connection to the base station network is maintained despite the hand-off. In such a hand-off, the base station is usually changed. The prior art also comprises a softer hand-off where the base station is not changed, but the sector of the base station used is changed. A soft and a softer hand-off are called make-before-break-type hand-offs, which means that a new connection is set up for the subscriber terminal before the connection to the previous base station is terminated. The frequency band used is not changed in either hand-off.

A cellular radio system usually comprises a TRAU (Transcoder/Rate Adaptor Unit) that is placed for example in connection with a base station controller or a mobile services switching centre. The TRAU source-encodes the signal and adapts the signal transmission rate to the transmission network, for example a Public Switched Telephone Network (PSTN). The TRAU forms TRAU frames that it transmits to the base station. The TRAU acts as a speech coder, i.e. a vocoder. The coding of the signal reduces the signal data rate for example in a transmission line to the base station. The vocoder and the base station transmit to and receive from each other data packets that form the aforementioned TRAU frames.

In a soft hand-off, a subscriber terminal communicates with several base stations simultaneously. In a soft hand-off, the subscriber terminal transmits to the base station a signal comprising the same information, the signal being forwarded to the vocoder. Also, the subscriber terminal receives a signal comprising the same information from the base station, which has received this signal from the vocoder. In cellular radio systems, the signal routing from the vocoder to the different base stations varies considerably, and the length of the transmission path between the vocoder and a base station may be great. Especially the length of the transmission path causes a delay in the signal to be transmitted between the vocoder and a base station. The length of the delay varies largely depending especially on the signal routing used. The delay causes problems during a soft hand-off in the simultaneous transmission of a signal by the base stations to a subscriber terminal. The prior arrangements typically determine the delay differences of the signals received by the vocoder. However, the determination of the delay differences requires continuous calculation.

CHARACTERISTICS OF THE INVENTION

The object of the present invention is to realize a soft hand-off in such a manner that despite the delays in the radio system the base stations simultaneously transmit a signal to the subscriber terminal during a hand-off. Another object of the invention is to avoid the calculation of the delay differences of the signals received by the vocoder.

This is achieved with a transmission method according to the invention used in a cellular radio system comprising base stations and at least one vocoder, the base stations and the vocoder transmitting a signal to each other, the base stations transmitting their signals substantially simultaneously, the vocoder receiving the substantially simultaneously transmitted signals at different moments of reception, in which method after the vocoder has received the first signal, signals are transmitted to the base stations the signals of which arrive at the vocoder at least partly during a predetermined time window.

The invention also relates to a cellular radio system comprising base stations and at least one vocoder, the base stations and the vocoder transmitting a signal to each other, the base stations transmitting a signal to the vocoder substantially simultaneously, the vocoder receiving the substantially simultaneously transmitted signals at different moments of reception, in which cellular radio system after the vocoder has received the first signal, the vocoder is arranged to transmit signals to the base stations the signals of which arrive at the vocoder at least partly during a predetermined time window.

The arrangement according to the invention provides several advantages especially in a soft hand-off. In the arrangement, the vocoder receives the signals transmitted by the base stations at different moments of reception. The arrangement employs a transmission method where signals are transmitted to the base stations substantially at the same moment when the first signal is received. In the arrangement according to the invention, the vocoder transmits a signal to the base stations the signals of which arrive at the vocoder during a predetermined time window. The signals received by the base stations are delayed, if required, to such an extent that the simultaneous transmission of signals by the base stations to the subscriber terminal is possible. The delaying is carried out in practice for example at the base station. In the arrangement according to the invention, the total delay of the TRAU and the base stations is not significant. Instead, especially the delay differences between the base stations are important.

DESCRIPTION OF THE FIGURES

In the following, the invention will be described in greater detail with reference to the examples according to the accompanying drawings, in which.

DESCRIPTION OF THE PREFERRED EMBODIMENTS

Figure 1:
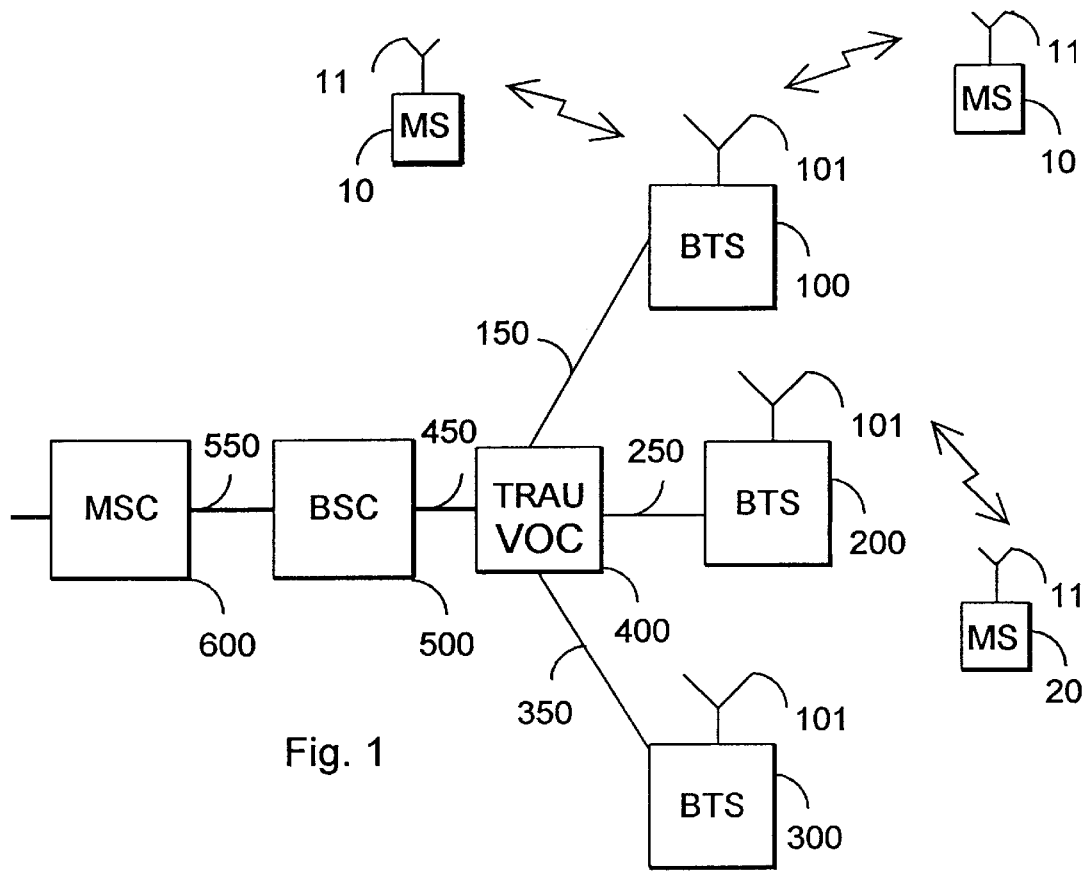
FIG. 1 shows a cellular radio system where the method according to the invention is utilized.

FIG. 1 shows a cellular radio system where the method according to the invention is utilized. The arrangement according to the invention is applicable for use in spread spectrum systems, especially in CDMA systems, without restricting the invention to the aforementioned systems, however. The cellular radio system comprises a number of subscriber terminals 10, 20, base stations 100, 200, 300, a base station controller 500, and a mobile services switching centre 600. The function of the base station controller 500 is to control the base stations 100, 200, and 300. The cellular radio system further comprises a vocoder 400 that acts as a speech coder. The vocoder is placed for example in connection with a TRAU. As regards speech coding, the vocoder 400 is realized according to known technology. The subscriber terminals 10 shown in the figure are in practice for example mobile phones. The subscriber terminals 10, 20 are as described in the prior art. The subscriber terminals shown in the figure comprise an antenna 11. The base stations 100, 200, 300 comprise an antenna 101.

The mobile services switching centre 600 is connected by a transmission line 550 to the base station controller 500, which is connected to the vocoder 400 by a transmission line 450. The vocoder 400 communicates via a transmission line 150 with the base station 100, via a transmission line 250 with the base station 200, and via a transmission line 350 with the base station 300. The transmission lines 150, 250, 350, 450 and 550 are implemented for example with PCM technique. These transmission lines can also be realized for example with radio links. In the arrangement shown in the figure, the vocoder 400 is placed between the base station controller 500 and the base stations 100, 200, 300. However, the vocoder 400 may also be located in some other part of the cellular radio system, for example in connection with the base station controller 500 or the mobile services switching centre 600.

Figure 2:
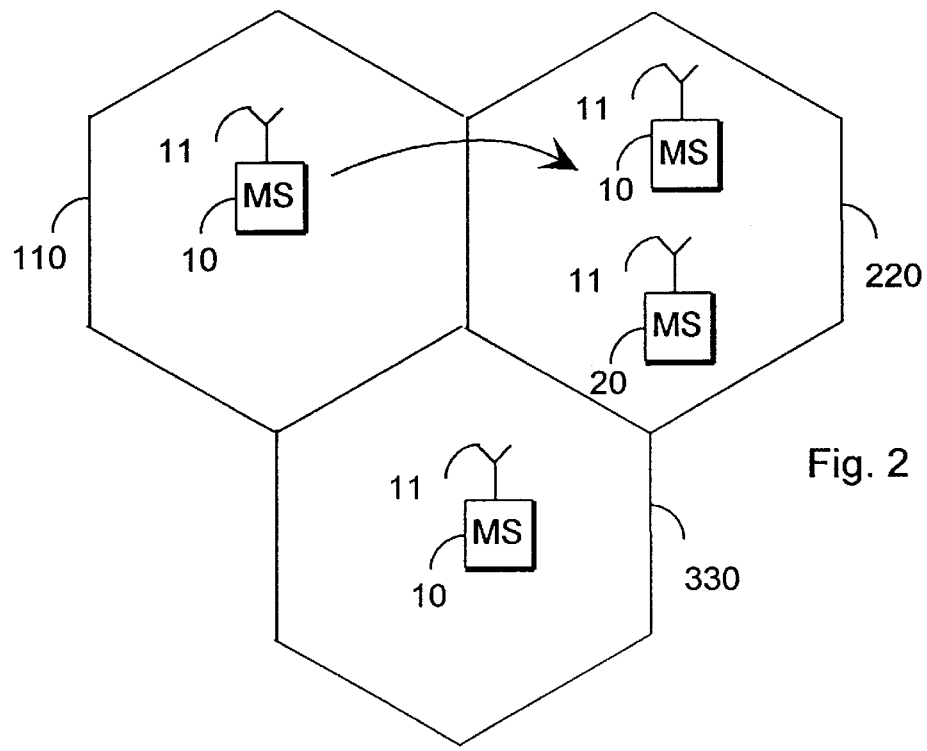
FIG. 2 shows the movement of a subscriber terminal in the cellular radio system during a hand-off.

FIG. 2 shows the movement of the subscriber terminal 10 in the cellular radio system during a hand-off. The figure shows that each base station 100, 200, 300 has its own coverage area 110, 210, 310. The subscriber terminal 10 moves at first in the coverage area of the base station 100. If the subscriber terminal 10 sets up a connection to some other subscriber terminal 20, the subscriber terminal 10 transmits a signal to the base station 100. The signal propagates via the transmission line 150 to the vocoder 400 from where the signal further propagates along a path according to known technology for example to another subscriber terminal. The propagation of the signal from the subscriber terminal 10, 20 via the base station 100, 200, 300 to the vocoder 400 is called a reverse direction.

If a connection is set up with the subscriber terminal 20 situated in the coverage area of the base station 200, the signal propagates along a path according to known technology for example to the base station controller 500. The signal propagates from the base station controller 500 to the vocoder 400. The vocoder 400 transmits the signal via the transmission line 250 to the base station 200. The base station 200 transmits the received signal via the radio path to the subscriber terminal 20. The propagation of the signal from the vocoder 400 to the base station 100, 200, 300 and further to the subscriber terminal 10, 20 is called a forward direction. Depending on the structure of the cellular radio system, the signal is delayed as it propagates between the different network elements of the system, such as the base stations 100, 200, 300, the vocoder 400 and the base station controller 500. The base stations 100, 200, 300 also cause a delay in the signal when they process it. It can be assumed, however, that the base stations 100, 200, 300 cause a processing delay that is of substantially equal length. It can also be assumed that the delay occurring in the air interface between the base stations 100, 200, 300 and the subscriber terminal 10 is substantially equal at all the base stations 100, 200, 300 communicating with the subscriber terminal 10.

The signal transmitted by the vocoder 400 and the base station 100, 200, 300 consists of data packets. The signal consisting of data packets is framed. The data packets comprise a frame number field that is given values for example from zero to three. The frames form a superframe, and the frame number depends on the location of the frame in the superframe. The length of the superframe may be for example 80 ms, and the length of the data packet 20 ms. The data packets transmitted by the base stations 200, 300 are synchronized. A data packet comprises for example coded speech.

Assume that the subscriber terminal 10 sets up a connection to another subscriber terminal 20. The subscriber terminal 10 moves during the connection from the coverage area 110 of the base station 100 to the coverage area 210 of the base station 200, in a manner shown in FIG. 2. The cellular radio system employs a soft hand-off so that the connection set up by the subscriber terminal 10 would not be cut off or interfered with. During a soft hand-off, the subscriber terminal 10 communicates simultaneously with the base stations 100, 200 that transmit a data packet containing the same data to the vocoder 400. The vocoder 400 also transmits to each base station 100, 200 a data packet comprising the same information. The base stations 100, 200 thereafter transmit a signal containing the same data to the subscriber terminal 20.

In the situation described above, the signal to be transmitted between the vocoder 400 and the base station 100, 200 is delayed. The delay causes problems since during a hand-off the base stations 100, 200 receive at different times the signal transmitted by the vocoder 400. In the arrangement according to the invention, the vocoder 400 is arranged to transmit a signal to the base stations 100, 200 after it has received the first signal from the base stations 100, 200. The vocoder 400 simultaneously transmits to the base stations 100, 200 a signal containing the same information. The vocoder 400 preferably transmits a signal to the base station 100, 200 at the same time as it receives the first signal. The vocoder 400 transmits a signal to the base stations 100, 200 if it receives the signal transmitted by the base stations 100, 200 within a preset period. In practice, the length of the period corresponds to the length of the data packet, which is typically 20 ms.

Assume that during a hand-off, the subscriber terminal 10 transmits a signal to several different base stations 100, 200, 300. The base stations 100, 200, 300 receive the signal and forward it to the vocoder 400. The base stations 100, 200, 300 transmit the signal to the vocoder 400 substantially simultaneously. In practice, the transmission is simultaneous, since the base stations 100, 200, 300 are synchronized. Since the routing of the signals to the vocoder 400 is different at each base station 100, 200, 300, however, the signals are provided with delays of different lengths. Assume also that the signal propagating along the transmission line 350 arrives first at the vocoder 400. Assume further that the signal that is received first arrives at the vocoder 400 for example one millisecond after the transmission. When the signal propagating along the transmission line 350 arrives at the vocoder, the vocoder 400 simultaneously transmits to the base stations 100, 200, 300 signals that contain the same forward information.

If the signals arriving at the vocoder 400 along the transmission lines 150 and 250 do not arrive within a predetermined period, transmission of a signal to the corresponding base stations 100, 200 is prevented. A signal containing the same information as the signal to be transmitted to the base station 300 is therefore not transmitted to the base station 100, 200 in the aforementioned situation. The transmission of the signal is prevented if the signal transmitted from the base station 100, 200 is not received at the vocoder 400 within at least 20 ms after the first signal has been received. The signals transmitted by the base stations 100, 200, 300 must therefore arrive at the vocoder 400 at least partly within a certain time from the moment when the first signal has been received. On the other hand, the total delay, or the common delay, between the TRAU acting as the vocoder and the base stations 100, 200, 300 is not significant for the invention. The total delay may be of any length in the invention.

Figure 3:
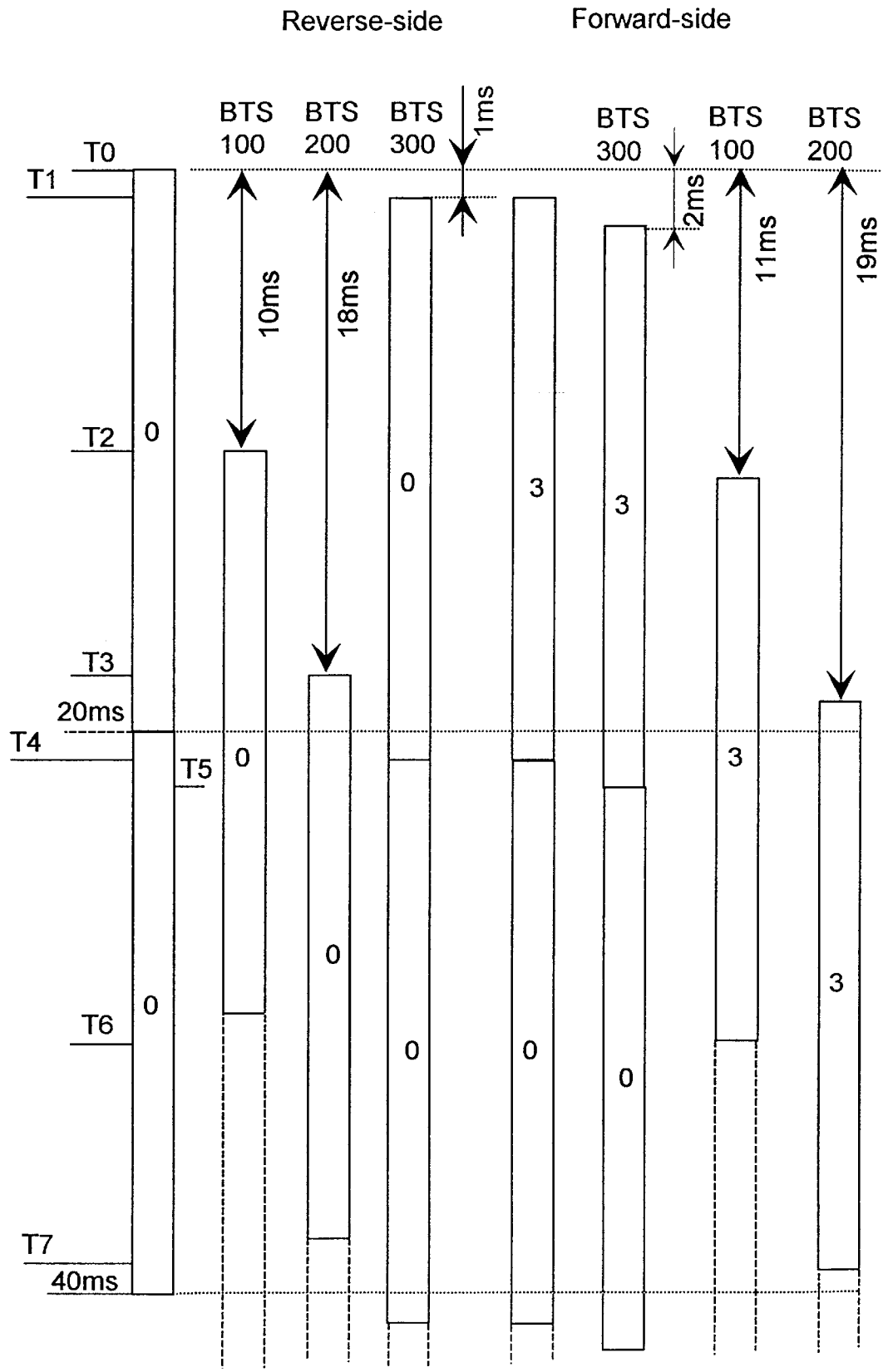
FIG. 3 shows schematically the timing of the transmission of signals.

FIG. 3 shows schematically the timing of the transmission of data packets. The figure shows in greater detail the transmission of the signal of the three base stations 100, 200, 300 and the vocoder 400 in the reverse and the forward direction. In the figure, the base stations 100, 200, 300 transmit their signals substantially at the same moment to the vocoder 400. It is assumed in the figure that the passage of time begins when the base stations 100, 200, 300 start transmitting signals simultaneously. The simultaneous transmission is started at a moment T0. The vocoder 400 receives a signal transmitted by the base station 300 at a moment T1=1 ms. A signal transmitted by the base station 100 arrives at the vocoder 400 at a moment T2=10 ms and a signal transmitted by the base station 200 arrives at the vocoder 400 at a moment T3=18 ms. The vocoder 400 therefore receives the signal transmitted by the base station 300 first of the three transmitted signals. The figure shows that the length of the data packet forming a part of the signal is 20 ms. The signals transmitted by the base stations 100, 200, 300 therefore arrive at the vocoder 400 at least partly within the time window corresponding to the length of the data packet.

At the moment T1, when the vocoder 400 receives the signal transmitted by the base station 100 in the reverse direction, the vocoder 400 simultaneously transmits a signal to the base stations 100, 200, 300 in the forward direction. The simultaneous transmission is possible since the signal transmission and reception by the vocoder 400 are synchronized. All three signals transmitted simultaneously by the vocoder 400 contain the same information. The signals transmitted by the vocoder 400 in the forward direction arrive at the base stations 100, 200, 300 in the same time that it took for the signals to arrive from the base stations 100, 200, 300 to the vocoder 400.

The signal transmitted by the base station 400 is received first by the base station 300. The signal transmitted by the vocoder 400 is received next by the base station 100. The signal transmitted by the vocoder 400 is received last by the base station 200. The base stations 100, 200, 300 receive the transmitted signals within the same predetermined period. The base stations 100, 200, 300 are arranged to delay, if required, the signals transmitted by the vocoder 400 in such a way that the simultaneous transmission of the signals to the subscriber terminal 10 is possible. In the above-described situation, the base station 300 is arranged to delay the received signal 17 ms and the base station 100 8 ms compared to the base station 200. The simultaneous transmission by the base stations 100, 200, 300 is possible since the base stations are synchronized with the same synchronization signal.

A formula that applies to the method according to the invention is disclosed below. With the formula it is possible to calculate in advance the correspondence between the delay difference of the received data packets and the length of the data packet.

$$\text{int}\{[\min(T1, T2, \ldots Tn) + \max(T1, T2, \ldots Tn)]/\text{LDP}\} = \text{int}\{[2\min(T1, T2, T3)]/\text{LDP}\}$$

In the formula, the symbol 'LDP' refers to the length of the data packet, 'int' indicates the formation of an integer, 'min' the selection of a minimum value and 'max' the selection of a maximum value. The moments when the data packets have been received are indicated with Tn (n=1, 2, 3, . . . ), whereupon for example T1 indicates the moment when the data packet arriving first at the vocoder has been received. If the moments of transmission of the data packets shown in FIG. 2 are inserted in the formula, it will be as follows:

$$\text{int}\{[\min(1\text{ ms}, 10\text{ ms}, 18\text{ ms}) + \max(1\text{ ms}, 10\text{ ms}, 18\text{ ms})]/20\text{ ms}\} = \text{int}\{[2\min(1\text{ ms}, 10\text{ ms}, 18\text{ ms})]/20\text{ ms}\},$$

which will be as follows after the minimum and maximum function have been solved $$\text{int}\{[(1\text{ ms}) + (18\text{ ms})]/20\text{ ms} = \text{int}\{[2(1\text{ ms})]/20\text{ ms}\},$$

and further $$\text{int}\{19/20\} = \text{int}\{2/20\}, \text{ i.e. } 0=0$$

The data packets are received in this case during a predetermined period, since equal numbers were obtained in each side of the formula. The total delay, or the common delay, between the TRAU and the base stations may be of any length, and only the delay difference between the base stations must be in accordance with the aforementioned formula. The delay tolerance can be increased, however, by lengthening the data packet. The delay over a satellite connection between a TRAU and a base station may be for example 200 ms. However, as regards the invention, the delay has no effect on the operation of the system if the delay difference complies with the requirements of the above formula.

Even though the invention is described above with reference to the example according to the accompanying drawings, it is clear that the invention is not restricted thereto, but it can be varied in several ways within the scope of the inventive idea disclosed in the appended claims.

I claim:

1. A transmission method used in a cellular radio system comprising base stations and at least one vocoder, the base stations and the vocoder transmitting a signal to each other, the base stations transmitting their signals substantially simultaneously, the vocoder receiving the substantially simultaneously transmitted signals at different moments of reception, in which method after the vocoder has received the first signal, signals are transmitted to the base stations the signals of which arrive at the vocoder at least partly during a predetermined time window;

wherein the signals consist of data packets, and the moments when the vocoder has received the data packets are indicated by a symbol Tn (n=1, 2, 3 . . . ), wherein for example a symbol T1 indicates the moment when the first signal arriving at the vocoder has been received, the moments of reception being indicated by the formula:

$$\text{int}\{[\min(T1, T2, \ldots Tn) + \max(T1, T2, \ldots Tn)]/\text{LDP}\} = \text{int}\{[2\min(T1, T2, T3)]/\text{LDP}\},$$

wherein the symbol 'LDP' indicates the length of the data packet, 'int' the formation of an integer, 'min' the selection of a minimum value, and 'max' the selection of a maximum value.

2. A cellular radio system comprising base stations and at least one vocoder, the base stations and the vocoder transmitting a signal to each other, the base stations transmitting a signal to the vocoder substantially simultaneously, the vocoder receiving the substantially simultaneously transmitted signals at different moments of reception, in which cellular radio system after the vocoder has received the first signal, the vocoder is arranged to transmit signals to the base stations the signals of which arrive at the vocoder at least partly during a predetermined time window;

wherein the signals consist of data packets and wherein the moments when the vocoder has received the data packets are indicated by a symbol Tn (n=1, 2, 3. . .), wherein for example a symbol T1 indicates the moment when the first signal arriving at the vocoder is received, the moments of reception being indicated by the formula:

$$\text{int}\{[\min(T1, T2, \ldots Tn) + \max(T1, T2, \ldots Tn)]/\text{LDP}\} = \text{int}\{[2\min(T1, T2, T3)]/\text{LDP}\},$$

wherein the symbol 'LDP' indicates the length of the data packet, 'int' the formation of an integer, 'min' the selection of a minimum value, and 'max' the selection of a maximum value.

3. A transmission method used in a cellular radio system, the system having a plurality of base stations and at least one vocoder, the transmission method comprising:

(a) each of the plurality of base stations transmitting a first signal to the at least one vocoder during a soft hand-off;
wherein the plurality of base stations transmit all of the first signals substantially simultaneously;

(b) the at least one vocoder receiving each of the first signals at different moments in time;
wherein one of the first signals is received by the at least one vocoder earliest in time, creating an earliest first signal thereby;

(c) the at least one vocoder transmitting a second signal to each of the plurality of base stations when the at least one vocoder (i) receives the earliest first signal and (ii) receives all other first signals at least partly within a predetermined time window after receiving the earliest first signal;
wherein (i) all of the signals consist of data packets and (ii) the size of the time window is adjusted by changing the length of the data packets; and (d) the plurality of base stations (i) receiving the second signal, creating a received second signal thereby, and (ii) arranged to delay the received second signal by a predetermined amount, the predetermined amount based upon the different moments in time associated with the first signals.

4. A method according to claim 3, wherein the second signal is transmitted to the plurality of base stations substantially simultaneously.

5. A method according to claim 3, wherein the second signal is transmitted to a particular one of the plurality of base stations if the first signal received from the particular one of the plurality of base stations arrived at the at least one vocoder within the predetermined time.

6. A method according to claim 3, wherein the different moments in time when the at least one vocoder has received the data packets are indicated by a symbol Tn (n=1, 2, 3 . . . ), wherein for example a symbol T1 indicates the moment in time when the earliest first signal arriving at the at least one vocoder has been received, the different moments in time of reception being indicated by the formula:

$$\text{int}\{[\min(T1, T2, \ldots Tn) + \max(T1, T2, \ldots Tn)]/\text{LDP}\} = \text{int}\{[2\min(T1, T2, T3)]/\text{LDP}\},$$

wherein the symbol 'LDP' indicates the length of the data packet, 'int' the formation of an integer, 'min' the selection of a minimum value, and 'max' the selection of a maximum value.

7. A method according to claim 3, wherein the plurality of base stations transmit in such a way that they are synchronized with a same signal.

8. A method according to claim 3, wherein the transmission of the second signal to the plurality of base stations and the reception of the earliest first signal from one of the plurality of base stations is synchronized.

9. A method according to claim 3, wherein the cellular radio system comprises at least one subscriber terminal communicating simultaneously with two or more base stations during the soft hand-off.

10. A cellular radio system comprising:
a plurality of base stations for transmitting first signals and receiving second signals;
at least one vocoder for receiving the first signals transmitted from the plurality of base stations and transmitting the second signals to the plurality of base stations;
wherein (i) each of the plurality of base stations transmits a first signal to the at least one vocoder during a soft hand-off, (ii) the plurality of base stations transmit all of the first signals substantially simultaneously, (iii) the at least one vocoder receives each of the first signals at different moments in time, and (iv) one of the first signals is received by the at least one vocoder earliest in time, creating an earliest first signal thereby; and
wherein the at least one vocoder transmits a second signal to each of the plurality of base stations when the at least one vocoder (i) receives the earliest first signal and (ii) receives all other first signals at least partly within a predetermined time window after receiving the earliest first signal;
wherein (i) all of the signals consist of data packets and (ii) the size of the time window is adjusted by changing the length of the data packets; and
wherein the plurality of base stations (i) receive the second signal, creating a received second signal thereby, and (ii) are arranged to delay the received second signal by a predetermined amount, the predetermined amount based upon the different moments in time associated with the first signals.

11. A cellular radio system according to claim 10, wherein the at least one vocoder is arranged to transmit the second signal to the plurality of base stations substantially simultaneously.

12. A cellular radio system according to claim 10, wherein the vocoder is arranged to transmit the second signal to a particular one of the plurality of base stations if the first signal received from the particular one of the base stations arrived at the at least one vocoder within the predetermined time window.

13. A cellular radio system according to claim 10, wherein the different moments in time when the at least one vocoder has received the data packets are indicated by a symbol Tn (n=1, 2, 3 . . . ), wherein for example a symbol T1 indicates the moment in time when the earliest first signal arriving at the at least one vocoder is received, the different moments in time of reception being indicated by the formula:

$$\text{int}\{[\min(T1, T2 \ldots Tn) + \max(T1, T2, \ldots Tn)]/\text{LDP}\} = \text{int}\{[2\min(T1, T2, T3)]/\text{LDP}\},$$

wherein the symbol 'LDP' indicates the length of the data packet, 'int' the formation of an integer, 'min' the selection of a minimum value, and 'max' the selection of a maximum value.

14. A cellular radio system according to claim 10, wherein the plurality of base stations transmit in such a way that they are synchronized with a same signal.

15. A cellular radio system according to claim 10, wherein the transmission of the second signal from the at least one vocoder to the plurality of base stations and the reception of the earliest first signal by the vocoder from one of the plurality of base stations is synchronized.

16. A cellular radio system according to claim 10, the system comprising at least one subscriber terminal communicating simultaneously with two or more base stations during the soft hand-off.

* * * * *